(12) United States Patent
Tao (10) Patent No.: US 11,109,292 B2
(45) Date of Patent: Aug. 31, 2021

(54) METHOD, USER EQUIPMENT AND COMMUNICATION SYSTEM FOR INTER-RAT HANDOVER IN 3G LTE

(75) Inventor: Yang Tao, Shanghai (CN)

(73) Assignee: Nokia Technologies Oy, Espoo (FI)

(*) Notice: Subject to any disclaimer, the term of this patent is extended or adjusted under 35 U.S.C. 154(b) by 620 days.

(21) Appl. No.: 12/866,978

(22) PCT Filed: Feb. 21, 2008

(86) PCT No.: PCT/CN2008/000373
§ 371 (c)(1),
(2), (4) Date: Aug. 10, 2010

(87) PCT Pub. No.: WO2009/103189
PCT Pub. Date: Aug. 27, 2009

(65) Prior Publication Data
US 2011/0090866 A1    Apr. 21, 2011

(51) Int. Cl.
*H04W 36/00* (2009.01)
*H04W 36/14* (2009.01)
*H04W 36/02* (2009.01)
*H04W 4/18* (2009.01)

(52) U.S. Cl.
CPC .............. *H04W 36/14* (2013.01); *H04W 4/18* (2013.01); *H04W 36/02* (2013.01)

(58) Field of Classification Search
USPC .......................................... 370/331; 455/436
See application file for complete search history.

(56) References Cited

U.S. PATENT DOCUMENTS

| 6,301,479 B1* | 10/2001 | Roobol et al. ................ 455/436 |
| 2008/0095362 A1* | 4/2008 | Blom et al. ..................... 380/45 |
| 2008/0188223 A1* | 8/2008 | Vesterinen et al. ........... 455/436 |

FOREIGN PATENT DOCUMENTS

| CN | 1960311 A | 5/2007 |
| CN | 101087475 A | 12/2007 |
| EP | 1 494 494 A2 | 1/2005 |
| JP | 2005123787 A | 5/2005 |

(Continued)

OTHER PUBLICATIONS

3GPP TS 36.300 Version 8.5.0, Jul. 2008.*
(Continued)

*Primary Examiner* — Mandish K Randhawa
(74) *Attorney, Agent, or Firm* — Fay Sharpe LLP (57) ABSTRACT

The invention provides a method for enabling inter-RAT handover in a communication system comprising a first network utilizing a first radio access technology and a second network utilizing a second radio access technology. When a user equipment moves from the first network into the second network and a handover is to be made, processing protocol data units (PDUs) in non-IP packet format and buffered in the first network or in the user equipment into IP packets in response to a handover confirmation (HOcfm) sent by the second network; forwarding the processed IP packets from the first network to the second network if the PDUs are buffered in the first network; and retransmitting the processed IP packets after the user equipment is switched to the second network. An user equipment and a communication system corresponding with the method of the invention are also provided.

15 Claims, 8 Drawing Sheets

(56) References Cited

FOREIGN PATENT DOCUMENTS

| JP | 2007-336490 | 12/2007 |
|---|---|---|
| WO | WO 2004/099919 A2 | 11/2004 |
| WO | WO 2007/052916 A1 | 5/2007 |

OTHER PUBLICATIONS

3GPP TS 36.300 version 8.2.0 (Sep. 2007).*
International Search Report for PCT/CN2008/000373.
"$3^{rd}$ Generation Partnership Project; Technical Specification Group Services and System Aspects; 3GPP System Architecture Evolution: Report on Technical Options and Conclusions (Release 7)", 3GPP TR 23.882, V1.14.0, Jan. 2008, pp. 1-14.
Ericsson, "Forwarding of UL Data during Intra-LTE HO" 3GPP TSG-RAN WG3 #57, R3-071502, Aug. 20-24, 2007, pp. 1-3.
"Consideration on the forwarding strategy in the IRAT HO scenario," 3GPP TSG-RAN WG1 #62, Meeting #58, R2-071659, Kobe, Japan, May 7-11, 2007,pp. 1-5.
Supplemental European Search Report for EP 08 71 4831 dated Oct. 16, 2013.

* cited by examiner

METHOD, USER EQUIPMENT AND COMMUNICATION SYSTEM FOR INTER-RAT HANDOVER IN 3G LTE

TECHNICAL FIELD OF THE INVENTION

The present invention relates to the field of telecommunications, and more particularly to inter radio access technology (inter-RAT) handover based on IP Packet forwarding in 3G LTE.

BACKGROUND OF THE INVENTION

Throughout the world, third-generation (3G) mobile services have been introduced for years. In order to maintain the future competitiveness of 3G technology in the next 10 years or even longer, Third Generation Partnership Project (3GPP) has launched the project LTE (Long Term Evolution)/SAE (System Architecture Evolution). The main targets for this evolution concern increased data rates, improved spectrum efficiency, and improved coverage, to provide a better support for the increasing requirement of operators and users. Particularly, SAE concerns the evolution of the total system architecture in order to simplify the network and provide integration, while LTE relates generally to radio access technology and access network architecture.

LTE/SAE uses an evolved Node B (eNodeB) and an access gateway (aGW). This configuration removes the radio network controller (RNC) of UMTS Terrestrial Radio Access Network (UTRAN) and serving General Packet Radio Service support node (SGSN) of core network from the equivalent 3G network architecture to make a simpler mobile network. LTE/SAE also includes entities to allow full inter-working with other related wireless technologies such as WCDMA and WiMAX.

Figure 1:
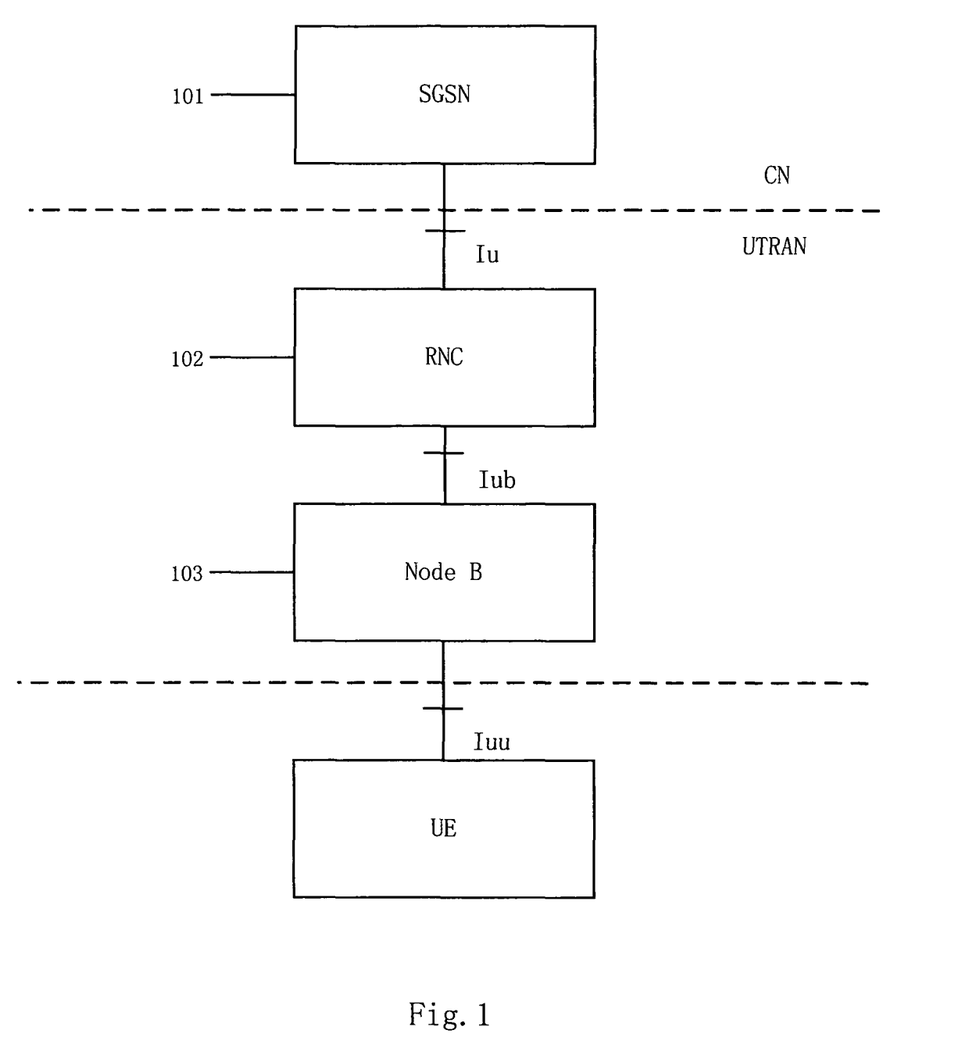
FIG. 1 shows the architecture of an UMTS representing the legacy 3G system.
Figure 2:
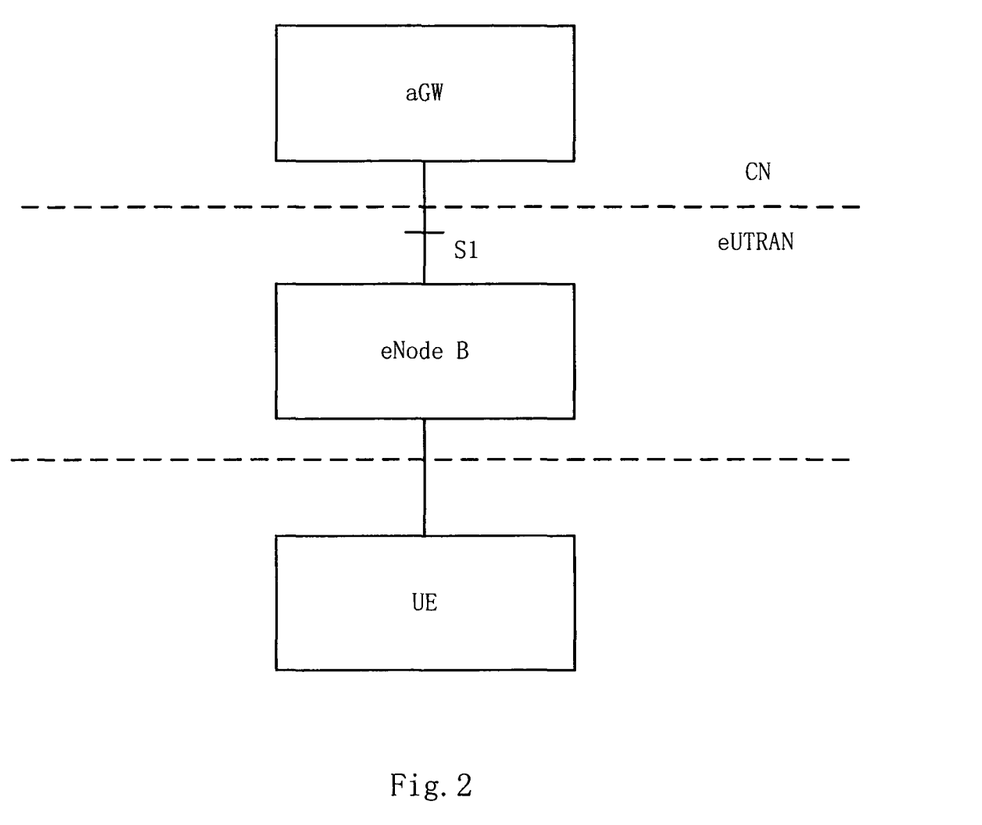
FIG. 2 shows the architecture of an evolved UMTS (e-UMTS) representing the LTE/SAE system.

By way of example, the legacy 3G network is considered to utilize techniques, standards, and systems based on an Universal Mobile Telecommunications System (UMTS). FIG. 1 and FIG. 2 show the architecture of UMTS and evolved UMTS (e-UMTS) respectively. As shown in FIG. 1, the legacy UMTS network 100 typically consists of three domains: Core Network (CN), UTRAN, and User Equipment (UE). The core network includes SGSN which is the control center of the network. The UTRAN communicates on the one hand with the mobile terminals UE, via an interface called the "Uu" interface (or radio interface), and on the other hand with the CN via an interface called the "Iu" interface. In the UTRAN, the Node B communicates with the base station controllers RNC via an interface called the "Iub" interface.

As shown in FIG. 2, RNC is cancelled for the purpose of simplifying network and decreasing latency. The e-UTRAN mainly includes evolved Node Bs, and functions of RAC are distributed to the eNodeBs and access gateways (aGWs). The functions of SGSN in the legacy network are included in aGW which is an MME/SAE (Mobility Management Entity/System Architecture Evolution) gateway. Each eNodeB is connected to access gateway(s) by means of a certain format of meshed connection or partly meshed connection. An eNodeB may be connected to a plurality of aGWs, and vice versa. The interface between e-Node Bs is called X2 (not shown) and the interface between an e-Node B and the CN (or Access Gateway) is called S1. For the purpose of simplicity, only one aGW and one eNodeB are depicted.

The architectures of e-UTRAN and UTRAN differ greatly, how to deal with the inter-RAT handover between LTE and legacy 3G has become a challenge. At the current stage, a Protocol Data Unit (PDU) based forwarding strategy for the inter-RAT handover is discussed by some companies. One of the so-called advantages is that there will not be any impact to the legacy system. In the legacy 3G system, the downlink user plane data is buffered as the format of RLC PDU (Radio Link Control—Protocol Data Unit). While for the uplink user plane data, the RLC PDU is buffered in the RLC layer. The RLC PDU may contain the sequence number, padding if possible, ciphering information and 3G Packet Data Convergence Protocol (PDCP) processing information. While in the LTE system, the user plan data may be buffered as the format of IP packets, PDCP PDU, RLC PDU and so on. Another point is that the legacy system and the LTE system may have different user plane process procedure. For example, the Robust Header Compression (ROCH) in 3G system may be different from the LTE system. The ciphering in LTE may be different than that of the legacy 3G system.

According to the PDU level forwarding, the RLC PDUs is forwarded to the LTE system in the 3G to LTE handover scenario, due to the difference procedures as mentioned above in different systems, these forwarded RLC PDUs can not be processed in the LTE system, and vice versa. Therefore, there is a need to propose a handover strategy for the inter-RAT handover between legacy 3G system and the LTE system.

SUMMARY OF THE INVENTION

The present invention provides for buffered data payloads changing into IP packets format and forwarded to a target network. The target network preferably retransmits the IP packets after the user equipment is switched to the target network.

The purpose of this IP packet forwarding strategy for the inter-RAT handover are as follows:

No context transfer is needed. For example, these IP packets are before ROHC process and then no ROCH context needs to be transferred.

Avoids packet loss. Those packets failed in the source system have the chance to be retransmitted in the target system.

Minimizes the duplication transmission in the Uu interface. Only those packets that failed in the source system will be forwarded and retransmitted.

In accordance with one aspect of the present invention, a method for enabling inter-radio access technology handover in a communication system is provided, the communication system comprising a first network utilizing a first radio access technology and a second network utilizing a second radio access technology, when a user equipment moves from the first network to the second network and a handover is to be made. The method comprises the steps of processing protocol data units (PDUs) in non-IP packet format and buffered in the first network or in the user equipment into IP packets in response to a handover confirmation (HOcfm) sent by the second network; forwarding the processed IP packets from the first network to the second network if the PDUs are buffered in the first network; and retransmitting the processed IP packets after the user equipment is switched to the second network.

In accordance with another aspect of the present invention, user equipment is provided. The user equipment is adapted to communicate with a first network utilizing a first radio access technology or communicate with a second network utilizing a second radio access technology. When the user equipment moves from the first network to the second network and a handover is to be made, the user equipment comprises processing means for processing protocol data units (PDUs) in non-IP packet format and buffered in the user equipment into IP packets in response to a handover confirmation sent by the second network, and retransmitting means for retransmitting the processed IP packets after the user equipment is switched to the second network.

Additionally a communication system according to the present invention is provided. The communication system comprises a first network utilizing a first radio access technology and a second network utilizing a second radio access technology. When user equipment moves from the first network to the second network and a handover is to be made, the first network comprises processing means for processing PDUs in non-IP packet format and buffered in the first network into IP packets in response to a handover confirmation sent by the second network and forwarding means for forwarding the processed IP packets from the first network to the second network. The second network comprises retransmitting means for retransmitting the processed IP packets after the user equipment is switched to the second network.

BRIEF DESCRIPTION OF THE DRAWINGS

It is believed that the features, advantages and purposes of the present invention will be better understood from the following description of the detailed implementation of the present invention read in conjunction with the accompanying drawings, in which.

DETAILED DESCRIPTION OF EMBODIMENTS OF THE INVENTION

Next, various embodiments of the invention will be described in detail in conjunction with accompanying drawings.

As mentioned above, FIG. 1 and FIG. 2 are schematic block diagrams of UMTS and evolved UMTS (e-UMTS).

Figure 3:
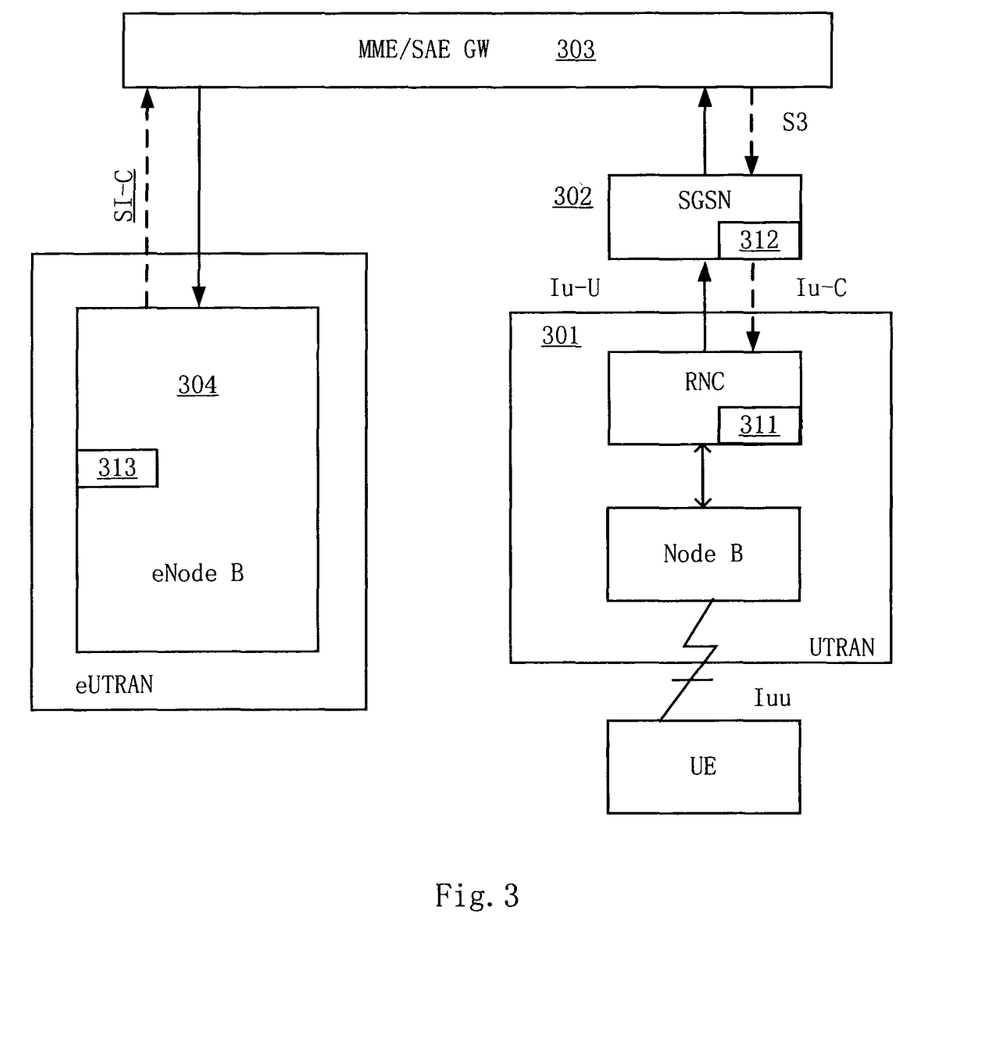
FIG. 3 shows a schematic diagram of the communication system to carry out the method for inter-RAT handover based on IP forwarding according to an embodiment of the invention.

Next, an embodiment of the invention will be described in reference to FIG. 3 and FIG. 4. FIG. 3 shows a schematic diagram of the architecture to carry out the method for inter-RAT handover based on IP forwarding of the invention.

In FIG. 3, the dashed line headed by an arrow is the route of control information i.e. the handover confirmation in this event, the solid line headed by an arrow is the route of user plane data i.e. the processed IP packets.

Figure 4:
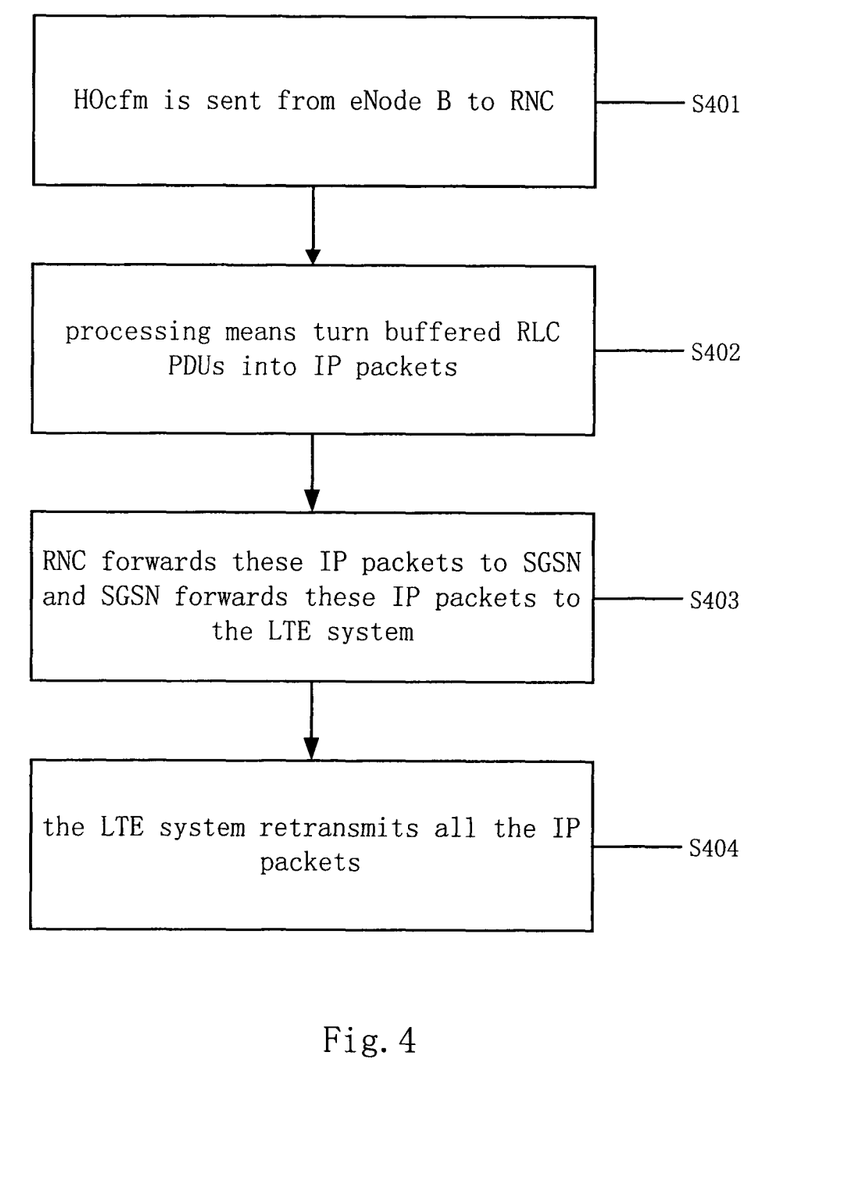
FIG. 4 shows a flow chart of the method for inter-RAT handover based on IP forwarding according to the embodiment of the invention.

FIG. 4 shows a flow chart of the method for inter-RAT handover based on IP forwarding of the invention. It should be apparent to one skilled in the art that both UMTS and evolved UMTS have various network elements performing various function, only those related to the present invention are illustrated in the figures.

In this embodiment, inter-RAT handover takes place from a legacy 3G system to a LTE system. In the legacy system in FIG. 3, RNC 301 is equipped with a processing means 311, SGSN 302 is equipped with a forwarding means 312. Retransmitting means 313 for example lies in eNodeB. It should be noted that the relative position of the functional blocks in this figure is only representative, and the present invention is not restricted by this structure. For example, the processing means 311 and the forwarding means 312 could be combined into one functional block. An UE 305 communicates with an UTRAN utilizing an UMTS Terrestrial Radio Access Technology (UTRA). It should be noted that UE 305 is equipped with multi-RAT capabilities, such as UTRAN, e-UTRAN, GSM if necessary, etc. S1 is the interface between eNodeB and MME/SAE gateway (GW 303): S1-C is the S1 interface on the control plane and S1-U is the S1 interface on the user plane. When UE 305 moves into an eUTRAN utilizing an eUTRA, an inter-RAT handover is to be made. This is known to one skilled in the art, so it is not necessary to describe it in more details. FIG. 4 shows a flow chart of the handover from the UTRAN to the eUTRAN with respect to the downlink data handling.

For the downlink (NodeB transmits data to UE) data handling, as shown in FIGS. 3 and 4:

The AM RLC PDUs which are not acknowledged by the UE and the AM/UM/TM RLC PDUs which are not sent to the UE before are buffered in RNC 301 of the 3G legacy system. It is well known that PDU in Radio Link Control (RLC) layer is called RLC PDU. AM, UM, TM are three kinds of RLC modes, wherein AM is Acknowledged Mode, UM is Unacknowledged Mode, TM is Transparent Mode. The RLC PDU may contain the sequence number, padding if possible, ciphering information and 3G Packet Data Convergence Protocol (PDCP) processing information, wherein PDCP is used in UMTS 3G network to map higher-level protocol characteristics onto the characteristics of the underlying radio-interface protocols, providing protocol transparency for higher-layer protocols. PDCP also provides protocol control information compression.

E-NodeB 304 sends handover confirmation (HOcfm) message to the MME/SAE GW 303 through interface S1-C (S1-Control plane), the MME/SAE GW 303 then forwards HOcfm to SGSN 302 through interface S3, and SGSN 302 forwards HOcfm to 3G RNC 301 through Iu-C (Iu-Control plane), the route of the handover confirmation is shown by means of the dashed line headed by an arrow in FIG. 3, this procedure is shown in step 401 of FIG. 4. In response to the handover confirmation, processing means 311 in RNC 301 processes the buffered RLC PDU in step 402. For example, means 311 extracts the sequence number of the PDUs, cancels the padding of the PDUs if they have, deciphers the PDUs if they are ciphered, and decompresses the PDUs if they are compressed, so that these RLC PDUs can be changed back into IP packets based on status report and other information. After that, RNC 301 forwards those IP packets to SGSN 302 through interface Iu-U and indicates these are forwarding IP packets and SGSN 302 forwards these IP packets to MME/SAE GW 303 of the LTE system through S4 interface in step 403, the route of the IP packets forwarding is illustrated by means of the solid lines headed by arrows in FIG. 3. Then in step 404, retransmitting means 313 in the LTE system, i.e. the e-UMTS retransmits all the IP packets received from the UMTS system, i.e. the legacy 3G to avoid data loss. At the UE side, the UE delivers the received RLC Service Data Units (RLC SDUs) to the higher layer to avoid data loss.

For the uplink(UE transmits data to NodeB) data handling:

RNC 301 delivers the received RLC SDUs to the higher layer to avoid data loss. At the UE side, the UE should process all the buffered AM RLC PDUs which are not acknowledged by the source 3G RNC to turn them into the IP packets. Additionally the UE should process all the buffered AM/UM/TM RLC PDUs, which are not transmitted before to turn them into the IP packets. After switching to the UMTS system i.e. the LTE system, the UE retransmits all the buffered IP packets in the LTE system to avoid data loss.

According to the above description, it can be seen, for the downlink data handling, the processing and forwarding steps take place in the legacy 3G (UMTS) system and the retransmitting step is implemented by the target system, i.e. the e-UMTS system, since the PDUs are buffered in the UMTS system. For the uplink data handling, the PDUs are buffered in the user equipment, the forwarding step is not necessary. The UE processes the buffered PDUs into IP packets in response to the HOcfm and retransmitting the processed IP packets itself after it is switched to the e-UMTS system.

Next, another embodiment of the present invention will be described in reference to FIG. 5 and FIG. 6.

Figure 5:
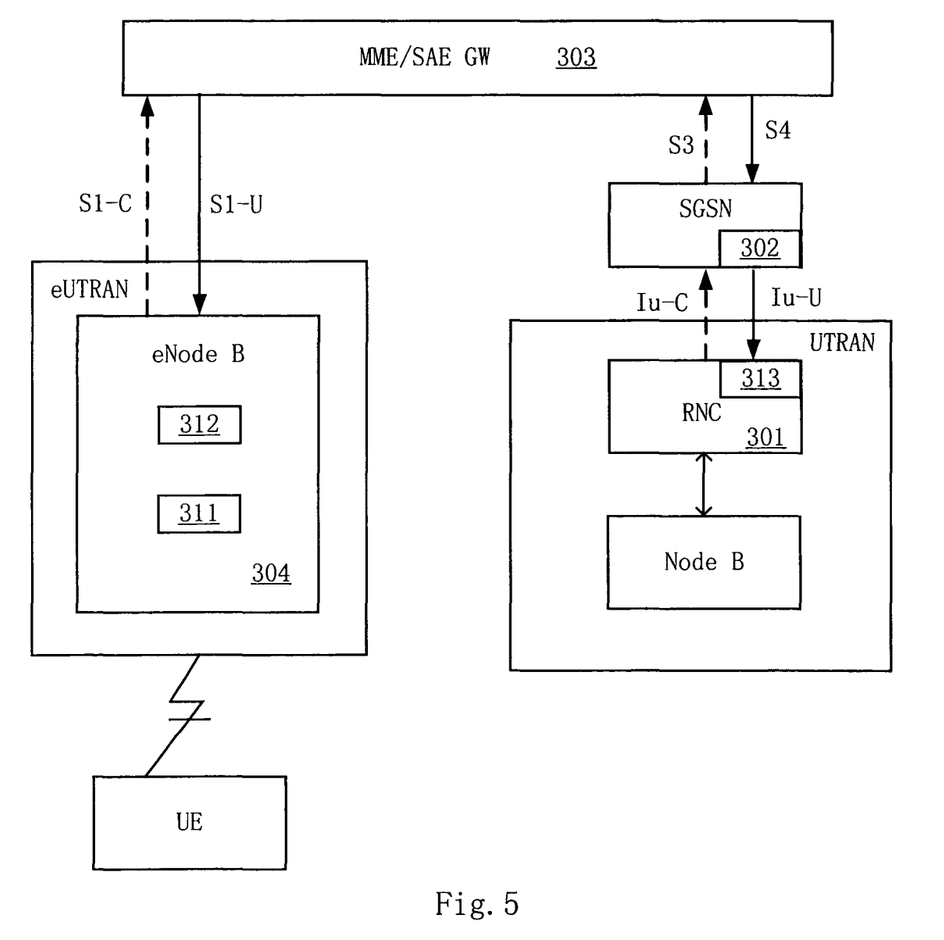
FIG. 5 shows a schematic diagram of the communication system to carry out the method for inter-RAT handover based on IP forwarding according to another embodiment of the invention.
Figure 6:
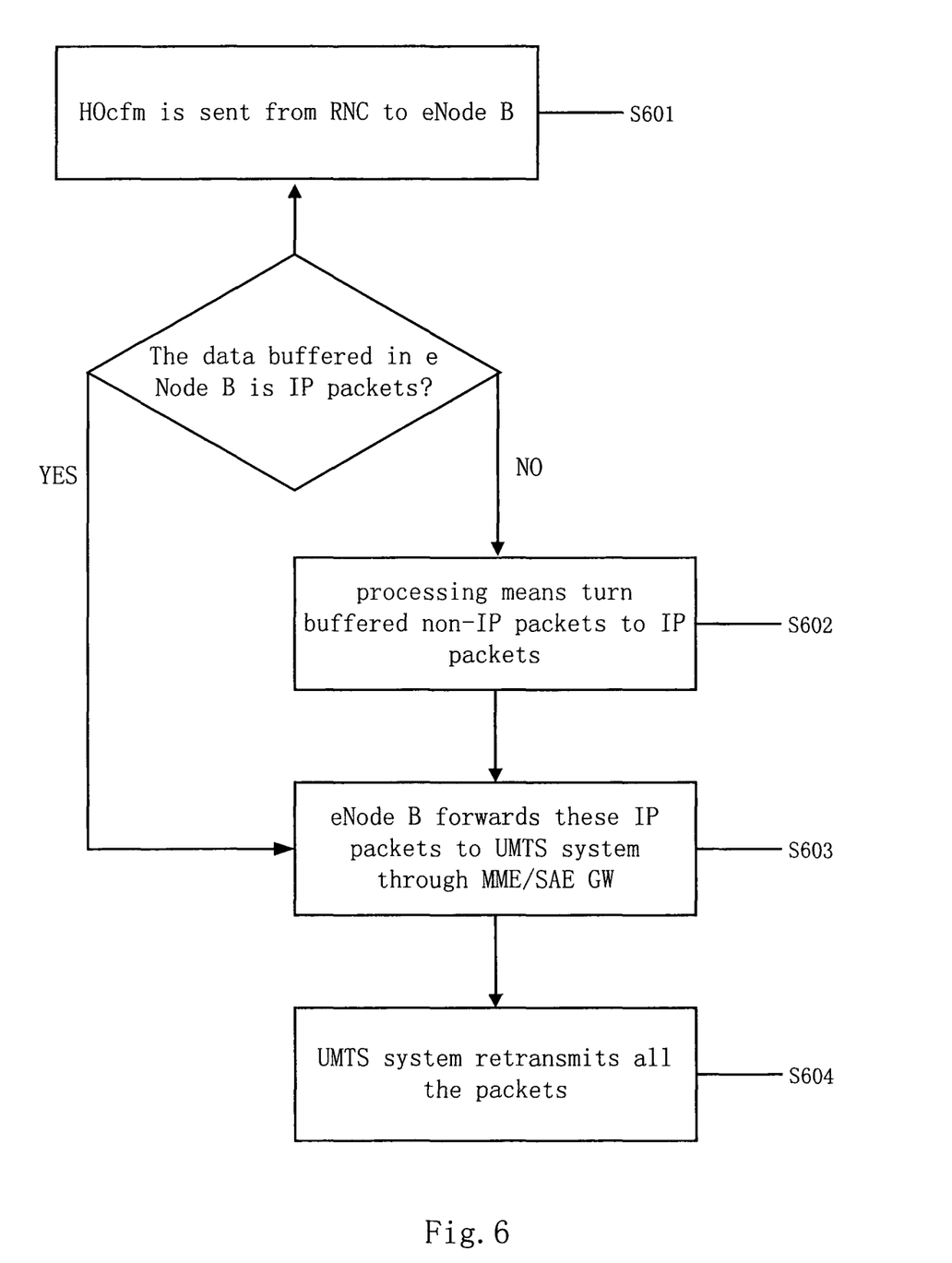
FIG. 6 shows a flow chart of the method for inter-RAT handover based on IP forwarding according to the embodiment of the invention.

FIG. 5 and FIG. 6 show respectively a schematic diagram of the architecture and a flow chart of the method for inter-RAT handover based on IP forwarding of the invention in the event of inter-RAT handover from the LTE system to the legacy 3G system. In FIG. 5, the dashed line headed by an arrow is the route of control information i.e. the handover confirmation in this event, the solid line headed by an arrow is the route of user plane data i.e. the processed IP packets.

In this event, the HOcfm message sent by RNC 301 passes through SGSN 302, MME/SAE GW 303 and arrives at eNodeB. The HOcfm passes through interfaces of Iu-C, S3 and S1-C, which can be clearly seen from FIG. 5.

For the Downlink data handling, the main steps are illustrated in FIG. 6:

Because till now, how the data payload will be buffered in the LTE system is still open. The buffered data may be IP packets or non-IP packets. Therefore the processing procedures are different for IP packets and non-IP packets. If the data payload buffered is in the IP packet format in LTE (e-UMTS) system, the procedure of turning the buffered data into IP packets is not needed. These IP packets include those which are not acknowledged by the UE based on the current status report, HARQ feedback and other information and those which are not sent to the UE before. The e-NodeB forwards these IP packets to the target system through MME/SAE GW 303 via S1-U as shown in step 603. If the data payload is buffered in non-IP packet format in LTE system, such as data payloads which are not acknowledged by the UE based on the current status report, HARQ feedback and other information and/or data payloads which are not sent to the UE before, e-NodeB 304 first turn the buffered data payloads into the IP packets format as shown in step 602 in FIG. 6. For example, means 311 in e-NodeB 304 extracts the sequence number of the PDUs, cancels the padding of the PDUs if they have, deciphers the PDUs if they are ciphered, and decompresses the PDUs if they are compressed, so that these non-IP packets can be changed back into IP packets. After that, the eNodeB 304 then forwards those IP packets to the target system through MME/SAE GW 303, which is shown in step 603. The target system i.e. the UMTS system retransmits all the IP packets received from the e-UMTS system to avoid data loss in step 604, this could be implemented by retransmitting means 313 located in RNC 301. The UE delivers the received RLC SDUs to the high layer and discards all the received RLC PDUs, which cannot be-reassemble into the RLC SDU.

For the uplink data handling:

The eNodeB 304 delivers all the received IP packets to the LTE User Plane Entity. While the RLC PDUs which cannot be re-assembled into the RLC SDU are discarded.

At the UE side:

If the data payload is buffed in the IP packets format, the procedure of turning the buffered data into IP packets is not needed. The UE forwards the IP packets to the target system directly. After switching, the UE should retransmit them. Otherwise, if the data payload is buffered in other format, the UE should turn the still buffered data payload into the IP packet format as the steps described above and then retransmits the processed IP packets by itself in the target system (the UMTS system) after switching.

The inter-RAT handover mechanism between legacy 3G system and LTE system based on IP packets forwarding has been described with reference to the two scenarios. In this inter-RAT handover mechanism based on IP forwarding, the packets failure in the source system can be retransmitted in the target system, this results in minimizing the data loss and helps to better the UE's experience. Only those packets not acknowledged in the source system are retransmitted in the target system, so the duplication transmission in the Uu interface is minimized, which contributes to avoid the radio resource wastes in the target system. Furthermore this forwarding is based on IP packets, which are buffered before the ROCH process. Then no ROCH context needs to be transferred to the target system, therefore no state transfer is needed.

Figure 7:
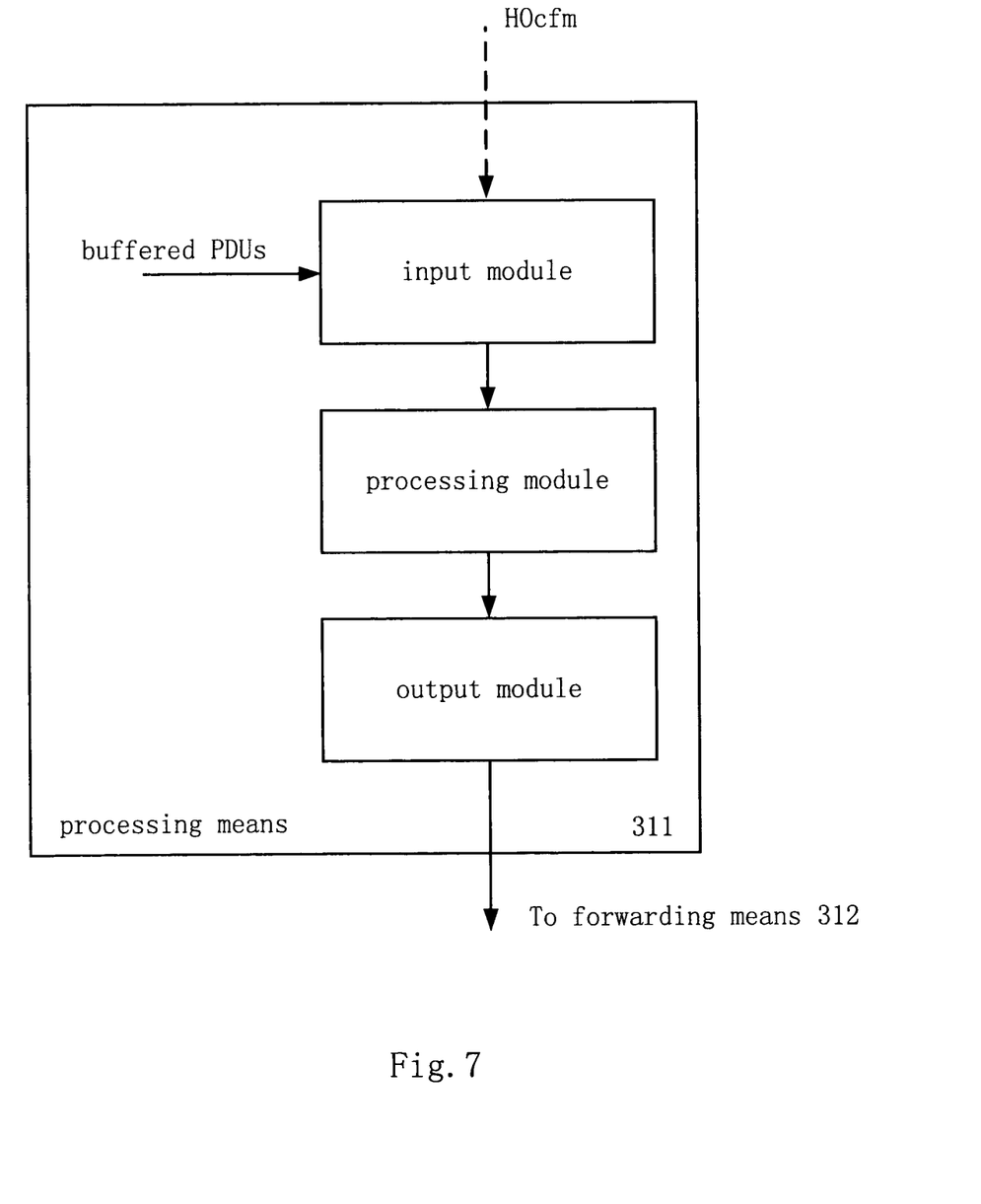
FIG. 7 illustrates an embodiment of the processing means used in the communication system according to the present invention.

FIG. 7 illustrates an embodiment of the processing means used in the communication system according to the present invention. As can be seen, the processing means 311 includes input module, processing module and output module. The role of input module is to receive buffered PDUs in the source network and the HOcfm sent by the target network. In response to the receiving of the HOcfm, the processing module turns the buffered PDUs into IP packets. As mentioned above, this procedure comprises extracting the sequence number of the PDUs, cancelling the padding of the PDUs if they have, deciphering the PDUs if they are ciphered, decompressing the PDUs if they are compressed, depending on the specific structure of the PDUs. The output module delivers the processed IP packets to the forwarding means. It is apparent for one skilled in the art that the output module could be combined with the forwarding means.

Figure 8:
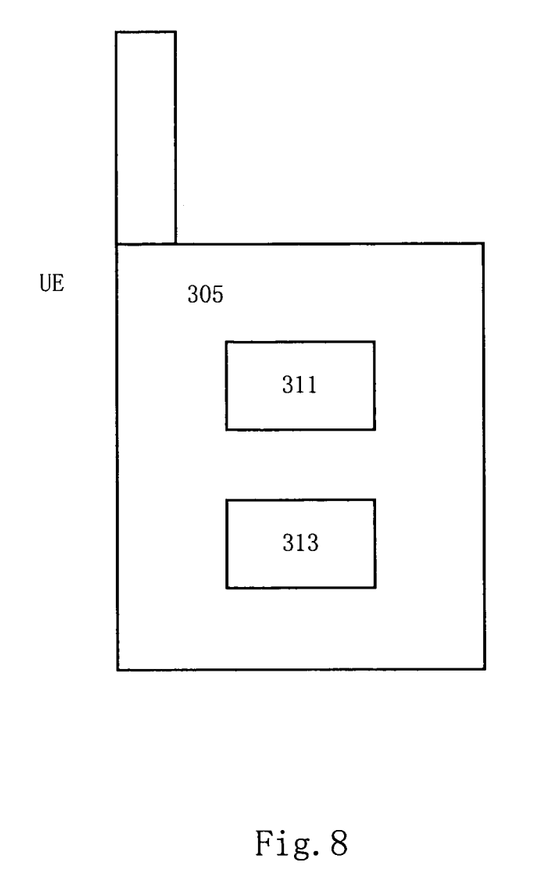
FIG. 8 illustrates an embodiment of an user equipment.

FIG. 8 illustrates an embodiment of an user equipment 305. UE 305 is equipped with multi-RAT capabilities, such as UTRA in legacy 3G system, e-UTRA in LTE system and other radio access technology if needed. Further, UE 305 comprises means 311 for processing buffered PDUs into IP packets. The processing means 311 further comprises input module for receiving handover confirmation message (HOcfm) and the buffered PDUs, processing module for turning the buffered PDUs into IP packets, and output module for outputting the processed IP packets to the retransmitting means 313. The main function of means 313 is to retransmit the processed IP packets in the target system when it is switched from the source network to the target network.

Although the exemplary embodiments of the method, the user equipment, and the communication system for enabling inter-RAT handover based on IP forwarding are described above in detail, the above embodiments are not exhaustive, and those skilled in the art can make numerous changes and modifications within the spirit and scope of the present invention. Therefore, the present invention is not limited to those embodiments, the scope of which is defined only by the appended claims.

The invention claimed is:

1. A method for enabling inter-radio access technology handover in a communication system comprising a first network utilizing equipment of a first radio access technology and a second network utilizing equipment of a second radio access technology, when a user equipment moves from the first network into the second network and a handover is to be made, said method comprising:
processing, in the first radio access technology equipment comprising a radio network controller or an evolved Node B of the first network, protocol data units in non-internet protocol packet format and buffered in the radio network controller or evolved Node B of the first network into internet protocol packets in response to a handover confirmation sent by the second network; and
forwarding the processed internet protocol packets from the first radio access technology equipment of the first network to the second radio access technology equipment of the second network.

2. The method according to claim 1, wherein said processing comprising extracting the sequence number of the protocol data units, cancelling the padding of the protocol data units if the protocol data units have padding, deciphering the protocol data units if the protocol data units are ciphered, and decompressing the protocol data units if the protocol data units are compressed.

3. The method according to claim 1, wherein one of the first radio access technology and the second radio access technology is universal mobile telecommunication system terrestrial radio access technology and the other is evolved universal mobile telecommunication system terrestrial radio access technology.

4. The method of claim 1 further comprising:
retransmitting the processed internet protocol packets after the user equipment is switched to the second network.

5. A method for enabling inter-radio access technology handover in a communication system comprising a first network utilizing a first radio access technology and a second network utilizing a second radio access technology, when a user equipment moves from the first network into the second network and a handover is to be made, said method comprising:
processing, by the user equipment, protocol data units in non-internet protocol packet format and buffered in the user equipment into internet protocol packets in response to a handover confirmation sent by equipment of the second radio access technology; and
retransmitting, by the user equipment, the processed internet protocol packets to the second radio access technology equipment of the second network after the user equipment is switched to the second network.

6. A user equipment configured to communicate with a first network utilizing a first radio access technology and to communicate with a second network utilizing a second radio access technology, said user equipment comprising:
a processor for processing protocol data units in non-internet protocol packet format and buffered in the user equipment into internet protocol packets in response to a handover confirmation sent by the second network; and
a transmitter for retransmitting the processed internet protocol packets after the user equipment is switched to the second network.

7. The user equipment according to claim 6, wherein the processor further comprises an input module for receiving handover confirmation message and the buffered protocol data units, a processing module for transforming the buffered protocol data units into internet protocol packets, and an output module for outputting the processed internet protocol packets to the transmitter.

8. The user equipment according to claim 7, wherein the processing module transforms the buffered protocol data units by extracting the sequence number of the protocol data units, canceling the padding of the protocol data units if the protocol data units have padding, deciphering the protocol data units if the protocol data units are ciphered, and decompressing the protocol data units if the protocol data units are compressed.

9. The user equipment according to claim 6, wherein one of the first radio access technology and the second radio access technology is universal mobile telecommunication system terrestrial radio access technology and the other is evolved universal mobile telecommunication system terrestrial radio access technology.

10. A communication system comprising:
a first network utilizing a first radio access technology comprising a radio network controller or an evolved Node B, the communication system comprising:
a processor, in equipment of the first radio access technology, for processing protocol data units protocol data units in non-internet protocol packet format and buffered in the radio network controller or evolved Node B into internet protocol packets in response to a handover confirmation sent by a second network utilizing a second radio access technology; and
a transmitter for forwarding the processed internet protocol packets from the first radio access technology equipment to the second radio access technology equipment of the second network.

11. The communication system according to claim 10, wherein the processor further comprises an input module for receiving handover confirmation message and the buffered protocol data units, a processing module for transforming the buffered protocol data units into internet protocol packets, and an output module for outputting the processed internet protocol packets to the transmitter.

12. The communication system according to claim 11, wherein the processor transforms the buffered protocol data units by extracting the sequence number of the protocol data units, canceling the padding of the protocol data units if the protocol data units have padding, deciphering the protocol data units if the protocol data units are ciphered, and decompressing the protocol data units if the protocol data units are compressed.

13. The communication system of claim 10 further comprising:
the second network, the second network utilizing the second radio access technology and wherein the second network includes a transmitter for retransmitting the processed internet protocol packets after the user equipment is switched to the second network when the user equipment moves between the first network and the second network.

14. The communication system according to claim 13, wherein one of the first radio access technology and the second radio access technology is universal mobile telecommunication system terrestrial radio access technology and the other is evolved universal mobile telecommunication system terrestrial radio access technology.

15. A method for enabling inter-radio access technology handover in a communication system comprising a first network utilizing equipment of a first radio access technology and a second network utilizing equipment of a second radio access technology, when a user equipment moves from the first network into the second network and a handover is to be made, said method comprising:
   forwarding internet protocol packets processed from protocol data units in non-internet protocol packet format in response to a handover confirmation sent by the second network and buffered in the first radio access technology equipment of the first network comprising an evolved Node B from the first radio access technology equipment of the first network to the second radio access technology equipment of the second network; and
   retransmitting the internet protocol packets after the user equipment is switched to the second network.

\* \* \* \* \*